United States Patent
Reimann

(10) Patent No.: US 11,175,396 B2
(45) Date of Patent: Nov. 16, 2021

(54) METHOD AND SYSTEM FOR HIGH RESOLUTION RANGE AND SPEEDOMETERS

(71) Applicant: Lambda:4 Entwicklungen GmbH, Hamburg (DE)

(72) Inventor: Rönne Reimann, Hamburg (DE)

(73) Assignee: LAMBDA: 4 ENTWICKLUNGEN GMBH

(*) Notice: Subject to any disclaimer, the term of this patent is extended or adjusted under 35 U.S.C. 154(b) by 315 days.

(21) Appl. No.: 16/391,487

(22) Filed: Apr. 23, 2019

(65) Prior Publication Data

US 2019/0339377 A1 Nov. 7, 2019

(30) Foreign Application Priority Data

May 4, 2018 (EP) .................................. 18170949
May 12, 2018 (EP) .................................. 18171965

(51) Int. Cl.
*G01S 13/76* (2006.01)

(52) U.S. Cl.
CPC .................................. *G01S 13/762* (2013.01)

(58) Field of Classification Search
CPC ...... B62J 27/00; G01S 13/867; G01S 13/931; G01S 2013/9316; G01S 2013/932; G01S 2013/9322; G01S 2013/93272; G01S 7/003; G01S 7/062; G01S 7/24

See application file for complete search history.

(56) References Cited

U.S. PATENT DOCUMENTS

| | | | | |
|---|---|---|---|---|
| 7,119,736 | B2* | 10/2006 | Heide | G01S 13/84 342/125 |
| 2010/0231410 | A1* | 9/2010 | Seisenberger | G01S 13/82 340/8.1 |
| 2010/0321245 | A1* | 12/2010 | Aoki | H04B 1/005 342/458 |
| 2011/0006942 | A1* | 1/2011 | Kluge | H04B 17/30 342/125 |

FOREIGN PATENT DOCUMENTS

| | | |
|---|---|---|
| DE | 102009060592 | 8/2010 |
| EP | 2196823 | 6/2010 |
| WO | 03081516 | 2/2003 |

* cited by examiner

*Primary Examiner* — Timothy A Brainard
(74) *Attorney, Agent, or Firm* — Sand, Sebolt & Wernow Co., LPA

(57) ABSTRACT

A method and a system for high-resolution measurement of distance between two objects by means of electromagnetic waves is such that measurements are performed in a reliable, simple, and quick manner with low bandwidth and high accuracy even in complicated multipath environments and/or with moving objects. The method includes determination of a supposed distance and/or supposed relative speed between first and second objects from an object of measurement by comparing the object of measurement with a set of stored and/or calculated reference objects of measurement. The reference objects of measurement relate to different distances and different relative speeds, each reference object being associated with a distance and a speed. The supposed distance and/or speed is assumed to be the distance and/or speed that is associated with the stored and/or calculated reference object of measurement that best fits, is closest to, and/or is most similar to the object of measurement.

19 Claims, 1 Drawing Sheet

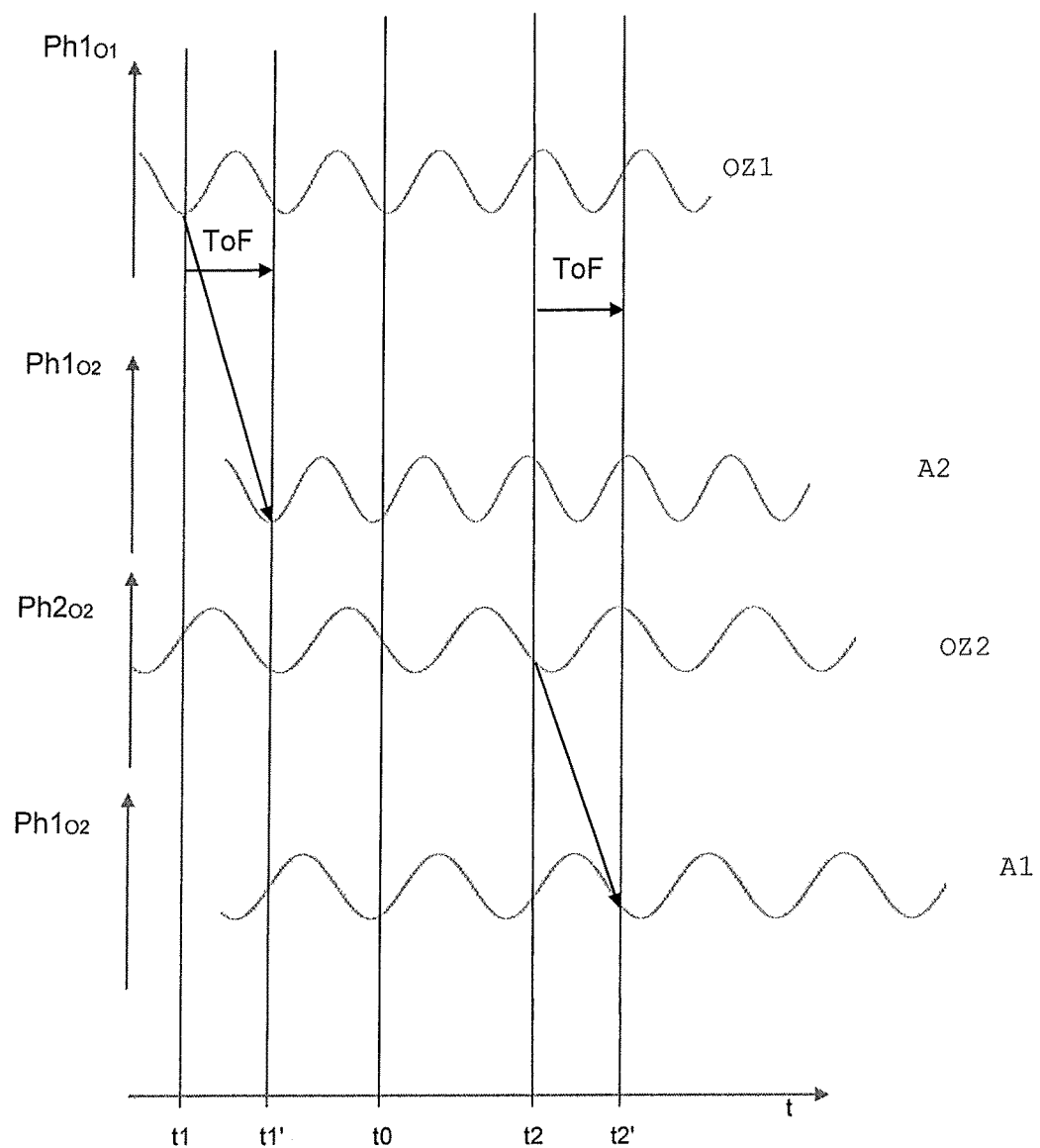

METHOD AND SYSTEM FOR HIGH RESOLUTION RANGE AND SPEEDOMETERS

TECHNICAL FIELD

The present invention relates to a method and a system for the high-resolution measurement of distance and/or speed by means of electromagnetic waves.

BACKGROUND

Background Information

Systems and methods for measuring distance are abundantly known, for example from EP 2196823.

SUMMARY

It is the object of the present invention to further develop such systems and methods such that distance measurements can be performed in a reliable, simple, and quick manner with low bandwidth and high accuracy even in complicated multipath environments and/or in the case of moving objects.

It is also an object to determine relative speeds, particularly low relative speeds, with limited of the signal transmission and/or analysis bandwidth with high accuracy, ideally together with the distance.

This object is achieved by a method for the high-resolution determination of a distance and/or a speed between a first object (O1) and a second object (O2) by means of electromagnetic signals that are transmitted between the first and the second object, comprising multiple execution of the following steps a to d at different first and different second frequencies, wherein the steps include a. transmitting a first signal at a first frequency from the first object with at least one first antenna; b. receiving the first signal at the second object with at least one second antenna; c. transmitting a second signal at a second frequency from the second object with the at least one second antenna; and d. receiving the second signal at the first object with the at least one first antenna, and providing at least one first piece of phase information for each first signal or for each execution of steps a to d determined from and/or by means of at least one identified phase relationship of the received first signal, and providing at least one second piece of phase information for each second signal or for each execution of steps a to d determined from and/or by means of at least one identified phase relationship of the received second signal, and forming an object of measurement, particularly a measurement matrix, from the first and second phase information and from at least one amplitude for each first and/or second piece of phase information or for each execution of steps a to d and determining a supposed distance and/or supposed speed between first and second object from the object of measurement, the supposed speed being a speed at which the objects move toward one another or away from one another, with the determination of a supposed distance and/or supposed relative speed between first and second object from the object of measurement being achieved through comparison of the object of measurement with a set and/or selection of stored and/or calculated reference objects of measurement relating to different distances and different relative speeds, with each reference object of measurement being associated with a distances and a speeds, with the supposed distance being assumed to be the distance that is associated with the stored and/or calculated reference object of measurement that best fits, is closest to, and/or is most similar to the object of measurement, and/or the supposed relative speed being assumed to be the speed that is associated with the stored and/or calculated reference object bf measurement that best fits, is closest to, and/or is most similar to the object of measurement. This object is achieved by a system for the high-resolution determination of a distance and/or speed between a first object (O1) and a second object (O2) by means of electromagnetic signals that are transmitted between the first and second objects, comprising the first and second objects, the first object having at least one first antenna and the second object at least one second antenna, comprising at least one control device at the first object and one control device at the second object and at least one evaluation unit containing a CPU and a memory, the first control device being set up to multiply execute the actions of a. transmitting a first signal at a first frequency from the first object with the at least one first antenna; and b. receiving a second signal at the first object with the at least one first antenna, and wherein the second control means being set up to multiply execute the actions of c. transmitting the second signal at a second frequency from the second object with at least one second antenna and d. receiving the first signal at the second object with the at least one second antenna, and with the at least one evaluation unit being set up for the purpose of providing at least one first piece of phase information for each first signal or for each execution of steps a to d determined from and/or by means of at least one identified phase relationship of the received first signal; and providing at least one second piece of phase information for each second signal or for each execution of steps a to d determined from and/or by means of at least one identified phase relationship of the received second signal; and forming an object of measurement, particularly a measurement matrix, from the first and second phase information and from at least one amplitude for each first and/or second piece of phase information or for each execution of steps a to d and determining a supposed distance and/or supposed relative speed between first and second object, the supposed speed being a speed at which the objects move toward one another or away from one another, with the determination of a supposed distance and/or supposed speed between first and second object from the object of measurement being achieved through comparison of the object of measurement with a set and/or selection of stored and/or calculated reference objects of measurement relating to different distances and different relative speeds, with each reference object of measurement being associated with a distances and a speeds, with the supposed distance being assumed to be the distance that is associated with the stored and/or calculated reference object of measurement that best fits, is closest to, and/or is most similar to the object of measurement, and/or the supposed relative speed being assumed to be the speed that is associated with the stored and/or calculated reference object of measurement that best fits, is closest to, and/or is most similar to the object of measurement.

In particular, the method according to the invention is carried out with a system according to the invention and/or the system according to the invention is set up to carry out a method according to the invention.

The object is achieved by a method for the high-resolution determination of a distance and/or a speed between a first object and a second object by means of electromagnetic signals that are transmitted between the first and the second object, comprising multiple execution of the following steps a to d at different first and different second frequencies:

Transmitting a first signal at a first frequency from the first object with at least one first antenna, receiving the first signal at the second object with at least one second antenna, transmitting a second signal at a second frequency from the second object with at least one, particularly the at least one second, antenna, and receiving the second signal at the first object with at least one, particularly the at least one first, antenna.

During the multiple executions—which particularly represent execution at least five times, more particularly at least two times, most particularly at least five times—different second frequencies and particularly at least two, more particularly at least five different first frequencies are used. The at least two, particularly at least five, particularly the first and/or second frequencies are particularly in the range from 400 MHz to 8 GHz and/or within a bandwidth of no more than 200 MHz, particularly no more than 100 MHz. The shortest distance between two, particularly all, of the at least two, particularly at least five first frequencies, particularly those which are adjacent in terms of frequency and/or temporal sequence, is particularly at least 25 kHz. The shortest distance between any two, particularly all, of the at least two, particularly at least five second frequencies, particularly those which are adjacent in terms of frequency and/or temporal sequence, is particularly at least 25 kHz. The greatest distance between two, particularly all, of the at least two, particularly at least five first frequencies, particularly those which are adjacent in terms of frequency and/or temporal sequence, is particularly no more than 10 MHz. The shortest distance between two, particularly all, of the at least two, particularly at least five second frequencies, particularly those nearest in terms of frequency and/or temporal sequence, is particularly no more than 10 MHz.

In particular, the method is carried out such that the time between step b and step c is at least 5 times as long as the time between step a and step b and/or such that the time between step c and step d is at least 5 times as long the time between step b and step c.

Specifically, the method is performed such that the time between step d and step a of the following execution is at least 5 times as long as the time between step a and step b and/or such that the time between step d and step a of the following execution is at least 5 times as long as the time between step c and step d.

The multiple executions can be carried out successively and/or simultaneously in whole or in part. In particular, the separation between them is less than or equal to one second, particularly less than or equal to 100 ms. In particular, at least five executions of steps a to d are carried out within a maximum of five seconds, particularly within a maximum of 100 ms.

The method also includes the provision of at least one first piece of phase information that is determined from and/or by means of at least one identified phase relationship of the received first signal for each first signal and/or for each execution of steps a to d, as well as the provision of at least one second piece of phase information that is determined from and/or by means of at least one identified phase relationship of the received second signal for each second signal and/or for each execution of steps a to d.

To determine the phase relationship, the received signal is mixed particularly with or on an intermediate frequency. The intermediate frequency is particularly 0 Hz.

The method also includes the formation of an object of measurement from the first and second phase information and for each first and/or second piece of phase information or for each execution of steps a to d for at least one amplitude. Advantageously, the object of measurement is a vector or a matrix and/or the object of measurement is a measurement matrix formed both from the first and second phase information and for each first and/or second piece of phase information or for each execution of steps a to d for at least one amplitude.

Advantageously, each first piece of phase information is obtained by calculating a first theoretical phase relationship for the second object at a first notional timepoint for each first signal and/or for each execution of steps a to d between respective first signal measured with one of the second antennas and respective second signal measured with one of the first antennas, and/or each second piece of phase information is obtained by calculating a second theoretical phase relationship for the first object at a second notional timepoint for each first signal between respective first signal measured with one of the second antennas and respective second signal measured with one of the first antennas.

The respectively used first antenna and the respectively used second antenna form an antenna combination and, in particular, is associated with each theoretical phase relationship of the antenna combination by means of which it was ascertained. Advantageously, at least for a selection of the possible antenna combinations of the at least one first and at least one second antenna for each execution of steps a to d, a first theoretical phase relationship and/or second theoretical phase relationship is calculated as phase information and, in particular, included in the object of measurement and/or used for the creation thereof. In particular, the selection includes at least five antenna combinations.

First and second notional timepoints are preferably close to one another, particularly no farther apart than 100 μs, more particularly no farther apart than 20 μs, most particularly no farther apart than 2 μs. In particular, they are as identical as possible—i.e., as identical as is permitted by the accuracy of the system used and/or the components used—and/or identical.

This is done in particular by determining the frequencies of the respective first signal and of the respective second signal at the second object and/or the frequency difference between the respective first signal and the respective second signal at the second object and/or by determining the frequencies of the respective second signal and respective first signal at the first object and/or the frequency difference between the respective second signal and the respective first signal at the first object.

In particular, the first and/or second notional timepoint and/or the notional timepoint at which first and second timepoint are identical lie or lies between the phase measurements at the first and second object, particularly in the center. In this way, the effects of inaccuracy in the frequency measurements and/or frequency difference measurements can be minimized.

In particular, phase relationships are used or included as phase information. In particular, the accumulated phase shift and/or phase difference of the transmissions of the first signal from the first to the second object and of the second signal from the second object to the first object or half of the accumulated phase shift and/or of the difference, or the sum of the respective first and second theoretical phase relationships or half thereof are/is used as phase information, particularly of the respective transmission of the signals between one of the first and one of the second antennas, and/or the phase information together with an amplitude, particularly of the received first or second signal, and/or normalized amplitude of the received first or second signal, particularly of the respective transmission of the signals between one of the first and one of the second antennas, are/is used in order to form at least one complex indicator of the object of measurement for each execution of steps a to d.

This is done particularly in such a way that the following formula is used as an indicator:

$$(\text{amplitude} \times \text{constant factor})e^{i(\text{1st phase shift} + \text{2nd phase shift}) \times 0.5}$$

In particular, the measured values, particularly complex indicators formed as described above, of the first and/or second antennas, particularly of a respective combination of one of the first and one of the second antennas, are each arranged in a row of an object of measurement, particularly in the form of a measurement matrix, the different rows being filled by measured values, particularly complex indicators formed as described above, of the antenna and/or antenna combinations for a respective execution of steps a to d, and the different column values of one row being respectively formed by the measured values, particularly complex indicators formed as described above, of a respective first and/or second antenna and/or antenna combinations.

If, for example, one carries out the steps a to d n times and uses e first and f second antennas, then e×f antenna combinations can be formed and thus e×f complex indicators obtained for every execution of steps a to d, which—or a selection of which—are arranged particularly in the columns of a row of the object of measurement, particularly measurement matrix, with particularly no more than e×f columns being present. Overall, a measurement value matrix with n rows and a maximum of e×f columns can be obtained by performing n executions.

It is with particular advantage that each complex indicator of a first and of a second signal of an execution of steps a to d for an antenna combination of a first and of a second antenna is associated with and/or formed according to the following calculation rule:

$$c1 \times Ae^{ix(phi1+phi2)} \times c2$$

where A is a measured amplitude, particularly the amplitude of the measurement of the respective first and/or of the respective second signal at the first and/or the second antenna of the respective antenna combination and/or includes same, for example as a sum, phi1 is the first theoretical phase relationship of the first and of the respective second signal of the respective antenna combination and/or phase shift of the transmission from the first to the second object and phi2 is the second theoretical phase relationship of the respective second and of the respective first signal of the respective antenna combination and/or phase shift of the transmission from the second to the first object, and c1 and c2 are constants and are particularly identical for all measured values of a measurement matrix.

The measurement matrix is thus formed, in particular, from the numbers or a selection of the numbers $$Mj,xy = c1 \times A(AKxy,j)e^{ix(phi1(AKxy,j)+phi2(AKxy,j))} \times c2$$

where Mj,xy is the number in the jth row and $0 < j \leq n$ and

AKxy is the antenna combination of the eth first and fth second antennas, mi $0 < x \leq e$ and $0 < y \leq f$, and phi1(AKxy, j) is the first theoretical phase relationship of the antenna combination AKxy of the jth execution of steps a to d and/or phase shift of the transmission from the first to the second object of the jth execution of steps a to d using the antenna combination AKxy, and phi2(AKxy, j) is the second theoretical phase relationship of the antenna combination AKxy of the jth execution of steps a to d and/or phase shift of the transmission from the second to the first object of the jth execution of steps a to d using the antenna combination AKxy, and c1 and c2 are constants are particularly identical for all measured values of a measurement matrix. The selection is particularly made such that all numbers Mj,xy of a selection of antenna combinations AKxy are not used. In particular, j indicates the row and xy the column of the measurement matrix, with xy being skipped by unused AKxy and/or the corresponding columns xy being removed.

Advantageously, the objects of measurement can be formed from at least one vector with complex numbers (this represents a 1×h or h×1 measurement matrix (where h is at least equal to 2)), particularly from at least two vectors, particularly by forming a matrix (this represents a g×h measurement matrix (where g and h, respectively, are at least equal to 2)), the matrix being formed in particular by using the vectors as columns or rows of the matrix, and/or in particular by forming an autocorrelation matrix, particularly an autocorrelation matrix of a matrix that is formed by using the vectors as columns or rows. In particular, the measurement matrix is a g×h measurement matrix (where g and h, respectively, are at least equal to 2).

In particular, the measurement matrix and/or the autocorrelation matrix of the measurement matrix can form the object of measurement and/or the object of measurement can be formed from the measurement matrix. In particular, an autocorrelation matrix is created from the measured values, particularly from a measurement matrix, as the object of measurement. It is also possible, however, for only those from a selection of antenna combinations can be used as indicators and/or included in the measurement matrix.

A measurement matrix of n executions of steps a to d with e first and/or f second antennas thus has particularly n lines and/or particularly from min (e,f) to e×f columns, particularly from e+f to e×f columns.

The method also includes the determination of a supposed distance and/or of a supposed, particularly relative, speed between the first and second objects from the object of measurement. The supposed speed is a speed at which the objects move toward one another or move away from one another and is thus particularly a one-dimensional relative speed between the objects.

The determination of a supposed distance and/or supposed relative speed between first and second object from the object of measurement is achieved by comparing the object of measurement with a set and/or selection of stored and/or calculated reference objects of measurement. The reference objects of measurement relate to different distances and different relative speeds, each reference object of measurement being associated with a distance and a speed.

The supposed distance is assumed to be the distance that is associated with the stored and/or calculated reference object of measurement that best fits, is closest to, and/or is most similar to the object of measurement. Alternatively or in addition, the supposed relative speed is assumed to be the speed that is associated with the stored and/or calculated reference object of measurement that best fits, is closest to, and/or is most similar to the object of measurement.

In that case, it is possible to work with multilevel comparisons in which the set and/or selection of the reference objects of measurement with which the object of measurement is compared is changed, particularly iteratively, particularly in order to iteratively increase the accuracy. In particular, a first, in particular small, selection of reference objects of measurement relating to a first distance range is initially utilized, and the selection continues to be compared to other, in particular small, selections of reference objects of measurement relating to respective distance ranges, relating to respectively greater distances than the previous selection, until a predetermined similarity of at least one reference object of measurement of the last-used selection to the object of measurement is exceeded and/or a predetermined distance to the object of measurement of at least one reference object of measurement of the last-used selection is undershot and/or the greatest similarity of a reference object of measurement of the selection to the object of measurement drops off compared to the greatest similarity of a reference object of measurement of the previous selection to the object of measurement or the shortest distance of a reference object of measurement of the selection to the object of measurement increases compared to the shortest distance of a reference object of measurement of the previous selection to the object of measurement.

In particular, a selection of reference objects of measurement is subsequently utilized, and the object of measurement is compared with these, which relate to distances and/or speeds having a maximum predetermined deviation from the speed and/or distance of the reference object of measurement of the last and or next-to-last selections that are most similar to, closest to, and/or best fit the object of measurement. Here again, it is possible to work iteratively with additional selections, each of which has a smaller predetermined maximum deviation in terms of speed and/or distance to the reference object of measurement that is most similar to, best fits, and/or is closest to the object of measurement in the preceding selection.

A small selection contains particularly no more than 20% of the available stored and/or calculated reference objects of measurement and/or no more than 400, particularly no more than 100 reference objects of measurement and/or at least 10 reference objects of measurement.

In particular, as a measure for the similarity and/or shortest distance, a metric is used, particularly after a projection, in particular of the object of measurement and/or of its eigenvectors and/or of its autocorrelation matrix or of a selection of the eigenvectors or linear combination thereof, into the space spanned by the set and/or selection and/or currently used selection of reference objects of measurement or vice versa. The selection is made particularly on the basis of the eigenvalues, omitting the eigenvalues to smaller eigenvalues than those which are not omitted.

The metric used is particularly that which meets the following requirements, also called a distance metric:

The distance between two non-identical objects x and y must not be less than zero. Two completely similar and/or identical objects have the distance zero. The distance between object x and object y is the same as between object y and object x. If one takes a "detour" over object y on the way from object x to object z, the path cannot be shorter than a direct path from object x to object z. Objects of measurement and/or reference objects of measurement are regarded as objects here.

In particular, this is a Euclidian distance and/or similarity metric. Specifically, a Manhattan distance and/or similarity metric, an L-norm, and/or Minkoswki distance and/or similarity metric is possible.

In particular, the distance and/or similarity is determined by the search for the reference object of measurement having the shortest distance from a hyperplane or subspace, particularly of lesser dimension than that of a hyperplane, in the reference space spanned by the set and/or selection of reference objects of measurement and/or currently used selection and/or the column vectors of the reference objects of measurement and/or of the currently used selection of the object of measurement or of its eigenvectors, that of its autocorrelation matrix and/or of a linear combination of the eigenvectors, particularly determined by a distance metric and/or the abovementioned metric. In particular, the subspace, the space, or the hyperplane is spanned by the column vectors of the measurement matrix that are projected into the reference space, particularly in the form of an autocorrelation matrix, its eigenvectors, or a selection of its eigenvectors, the selection of the eigenvectors being performed particularly in that the z eigenvectors having the largest eigenvalues are used, where z, in particular, is smaller than the rank of the measurement matrix×0.75 and/or of the object of measurement×0.75 and/or less than 10 and/or less than 6 and/or less than or equal to the number of antenna combinations used to form the measurement matrix and/or the object of measurement.

The reference objects of measurement in particular represent matrices, particularly autocorrelation matrices. In particular, the reference objects of measurement are each equal to the object of measurement that is to be expected and/or is measured and/or is created given the speed and/or distances between the two objects associated with the respective reference object of measurement when an inventive, particularly the same, method is carried out, particularly in an undisturbed single-path arrangement and/or in particular at the first frequencies and the second frequencies and/or in particular with the same selection of antenna combinations, until the object of measurement is determined with the two objects. In particular, the reference objects of measurement each have the same dimension as or a larger dimension than the object of measurement, particularly the measurement matrix; in particular, they have complex numbers, in particular complex measured values, before the reduction of their dimension or rank. In particular, the reference objects of measurement are selected and/or formed in such a way that each reference object of measurement is identical to an object of measurement that is obtained and/or can be expected, particularly in an undisturbed single-path arrangement, when an inventive, particularly the same, method is carried out, with execution at the distance and speed between the objects that are associated with the reference object of measurement, particularly at the first frequencies and the second frequencies that are associated with the reference object of measurement and/or particularly with the same selection of antenna combinations that is associated with the reference object of measurement. An "undisturbed single-path arrangement" is to be understood particularly as the arrangement of the two objects in an empty space that, in particular, is infinitely large and/or whose edges do not reflect or reflect only less than 10% of the radiation and/or that is at least ten times, particularly at least 100 times as large as the distance between the two objects in every direction.

The reference objects of measurement can be detected, for example, by generating objects of measurement at known distances and speeds between the two objects, particularly in an ideal undisturbed arrangement, particularly in an undisturbed single-path environment. Preferably, however, particularly in order to rule out measurement inaccuracies and environmental influences, they are calculated, particularly for an undisturbed single-path environment, i.e., for the case of the arrangement of the two objects in a free space without obstacles and/or in the case of rectilinear propagation of the signals from the transmitter to the receiver and/or between first and second object, particularly for at least one set and/or selection of distance and speed combinations, particularly at least 20, more particularly at least 100 distance and speed combinations, particularly at a minimum of 10, more particularly at a minimum of 500 different distances and/or speeds.

In particular, the reference objects of measurement are determined through calculation of complex reference indicators and arrangement of complex reference indicators in a respective matrix for each reference object of measurement, this matrix or its autocorrelation matrix being used as a reference object of measurement. In particular, the reference objects of measurement are obtained in this way. In particular, the complex reference indicators are respectively calculated by calculating the propagation, particularly of the phase shift and/or amplitude, of a first signal from one of the first antennas of the first object, particularly at a first frequency and/or first reference frequency, to one of the second antennas of the second object and of a second signal from the second antenna of the second object to the first antenna of the first object, particularly at a second frequency and/or second reference frequency. In particular, a complex reference indicator is calculated for each reference object of measurement for each execution of steps a to d and/or for each sequence of first and second signal and/or frequency and for each antenna combination that is used, required, and/or selected. In particular, a complex reference indicator is calculated for a respective distance and speed combination between the objects and for each execution of steps a to d and/or for each sequence of first and second signal and for each antenna combination that is used, required, and/or selected. In particular, the calculations are performed such that intermediate results can be (re)used for a plurality of calculations of reference indicators.

The complex reference indicators of a reference object of measurement correspond particularly to the complex indicators of the object of measurement that is obtained and/or can be expected, particularly in an undisturbed single-path arrangement, particularly without reduction of the dimension, when an inventive, particularly the same, method is carried out, with execution at the distance and speed between the objects that are associated with the reference object of measurement, particularly at the first frequencies and the second frequencies that are associated with the reference object of measurement and/or particularly with the same selection of antenna combinations that is associated with the reference object of measurement.

In particular, the reference objects of measurement are each associated with a sequence and/or set of different first reference frequencies and/or a sequence and/or set of different second reference frequencies and/or a sequence and/or set of different first and/or second signals. In particular, the reference objects of measurement are each associated with a sequence and/or set of antenna combinations. The reference objects of measurement are particularly formed such that they are identical to objects of measurement that are obtained and/or can be expected, particularly in an undisturbed single-path arrangement, when the method is carried out with the sequence and/or set of different first reference frequencies as different first frequencies and/or with the sequence and/or set of different second reference frequencies as different second frequencies and/or with the sequence and/or set of antenna combinations as a selection of antenna combinations and/or first and/or second antennas.

In particular, the reference objects of measurement are calculated for the antenna combinations that are used and/or selected and/or the first and second signals and/or the first and second frequencies for a selection of distances and/or speeds, particularly during the multiple executions of steps a to d of the method.

It is with particular advantage that the first and second frequencies of an execution of steps a to d are selected so as to be as identical as possible, particularly with a difference of less than 20 kHz, more particularly less than 200 Hz, and/or less than 1 per mille of the frequency of the first and/or second signal, particularly less than 0.1 parts per mille of the frequency of the first and/or second signal. This can be done, for example, through the prior exchange of electromagnetic waves between the first and second object by means of which the local oscillators are tuned to identical and/or maximally similar frequencies, particularly with a difference of less than 20 kHz, more particularly less than 200 Hz, and/or less than 1 per mille of the frequency of the first and/or second signal. In such a configuration with frequency differences of less than 20 kHz, particularly less than 200 Hz, and/or less than 1 per mille of the frequency of the first and/or second signal, the frequency difference measurement can be dispensed with, and it can be assumed that the frequencies are equal. The reference objects of measurement are then particularly associated with a sequence and/or set of reference frequencies instead of a sequence and/or set of first reference frequencies and a sequence and/or set of second reference frequencies. The reference objects of measurement are then formed particularly such that they are identical to objects of measurement that are obtained and/or can be expected, particularly in an undisturbed single-path arrangement, when the method is carried out with the sequence and/or set of different reference frequencies as different first frequencies and as different second frequencies and/or with the sequence and/or set of antenna combinations as a selection of antenna combinations and/or first and/or second antennas.

It is also possible to use frequencies that differ more starkly, however.

Since the first notional timepoint and the second notional timepoint usually differ at least slightly from one another in practice, a phase error—particularly in the magnitude of the time deviation between first notional timepoint and second notional timepoint multiplied by the frequency difference—generally arises in the event of frequency differences during the calculation of the theoretical phase relationship(s) for the notional timepoint(s). However, since phase errors as a result of other influences such as jitter and noise must generally also be expected, it is generally sufficient to have the frequencies converge toward one another or to select convergent frequencies such that no error is produced that would not be present due to other influences in any case. A phase error due to the time inaccuracy and the frequency difference of less than or equal to 10°, particularly less than or equal to 3°, is therefore often sufficient. The method is therefore preferably set up such that the difference between the first notional timepoint and the second notional timepoint multiplied by the difference of the frequency of the first and the frequency of the second signal during an execution of steps a to d, particularly all executions of steps a to d, is less than 10°, particularly less than or equal to 3° and/or less than the phase error due to noise and jitter in the measurement of the phase relationship at the first and/or second object and/or less than the error in the detection of first and/or second phase information.

It is with particular advantage that the objects of measurement include the phase information of the received first and/or second signals and the amplitude of the received first and/or second signals.

The first signals for each different execution of steps a to d can be the same or different and/or the second signals for each different execution of steps a to d can be equal or unequal and/or the first signal of each execution of steps a to d can be the same or different from the second signal for each execution, particularly in terms of the signal characteristic, the amplitude, polarization, and/or the information on the amplitude and/or polarization modulated in the signal. This also applies to the frequency, with it being particularly preferred if the first signal and the second signal within each execution of steps a to d are identical in frequency or contain at least one common first and second frequency, the first and second signals and/or first and second frequencies of different executions of steps a to d differing from one another, particularly at least in part.

It is with particular advantage that the method includes transmitting and/or exploiting the respective frequency differences between the first and the second frequency at the first and/or at the second object and/or at the first and/or second frequencies at the first and/or second object for the purpose of processing the object of measurement and/or determining the first and/or second theoretical phase relationship and/or determining the supposed distance and/or supposed relative speed.

In particular, the object of measurement is processed before the comparison with the reference objects of measurement in order to eliminate and/or reduce the effects of phase jumps and/or multipath environments and/or environmental influences and/or measurement errors and/or to reduce the effects of noise, phase jitter and/or measurement errors and/or to reduce the dimension of the object of measurement.

It is with particular advantage that the method includes the processing of the object of measurement through reduction of the dimension, particularly on the basis of the eigenvalues, due to the fact that only the eigenvectors of the z largest eigenvalues of the object of measurement or linear combinations thereof are used as the object of measurement, the selection of the eigenvectors being performed particularly in that the z eigenvectors having the largest eigenvalues are used, where z, in particular, is smaller than the rank of the measurement matrix×0.75 and/or of the object of measurement x 0.75 and/or less than 10 and/or less than 6 and/or less than or equal to the number of antenna combinations used to form the measurement matrix and/or the object of measurement.

It is with particular advantage that the processing of the object of measurement includes, particularly in a first step, the processing of the included phase information or included phase relationships, first and/or second theoretical phase relationships and/or of the complex indicators, particularly by halving at least some, particularly all, of the phase information or phase relationships, particularly at least some of the imaginary components or phase components of the complex indicators, particularly as a function of the values contained in the object of measurement relating to adjacent first and/or second frequencies.

In particular, particularly subsequently, processing is performed, particularly modification and/or reversal of the phase relationship and/or phase information by 180°, particularly of the phase relationship of a complex indicator, particularly when, as a result of the change in the phase information and/or phase relationship of the complex indicator, the difference from the phase information and/or subsequent execution of steps a to d and/or execution of steps a to d at the next-higher first and/or second frequency and/or sum of first and second frequency and/or next-lower first and/or second frequency and/or sum of first and second frequency of the executions, and/or the difference from the phase information and/or phase relationship of the complex indicator of the complex indicator arranged in the same column but one row above and/or below is reduced, particularly in consideration of the phase information and/or phase relationships with the amplitude of the complex indicator, particularly in consideration of modulo 2 Pi.

It is with particular advantage that the processing of the object of measurement includes the processing of the included phase information or phase relationships, first and/or second theoretical phase relationships, and/or the complex indicators, particularly through addition or subtraction of 180° at least to or from some of the pieces of phase information or phase relationships, particularly at least to or from some of the complex indicators, particularly as a function of the values contained in the object of measurement relating to adjacent first and/or second frequencies.

In particular, all phase information and/or complex indicators of a row of a measurement matrix, particularly of all rows of a measurement matrix, are each processed identically, for example by adding 180° to the phase information or phase relationship, particularly to the phase relationship of the complex indicator.

As a result, the phase shift between the executions of steps a to d can be observed and/or corrected simultaneously for all antenna combinations.

In particular, a decision is then made as to whether the phase relationship should be changed by 180°, whether, as a result of this, the sum over one line, all antenna combinations of one line or of an execution of steps a to d and/or all columns and/or an execution of steps a to d, the differences of the phases to the phases of at least one, in particular two, other executions of steps a to d and/or the sum of the absolute values of the phases over one row, all antenna combinations, and/or all columns, and/or an execution of steps a to d, particularly of an object of measurement, and/or sum of the phases that are particularly weighted with the respective amplitude of the measured value phases is reduced. In particular, the phase relationship is changed by 180° in the case of a reduction as a result of such a change in the phase relationship by 180°; otherwise, no change is made.

In particular, the sum of phase(Mj,xy) and/or amplitude (Mj,xy)×phase(Mj,xy) is formed for a respective j over all xy, and it is checked whether it is reduced as a result of changing all phase relationships by 180° in Mj,xy for this j, and in the case of a reduction, the phase relationship is changed by 180°.

In particular, as an alternative or in addition, the sum is formed for a respective j=j1 over all xy of the numbers Mj1,xy−Mj2,xy and/or numbers Mj1,xy−Mj2,xy−Mj3,xy, where j1< >j2< >j3 and j1< >j3, in particular j2+1=j1 and j1+1=j3, and it is checked whether it is reduced as a result of changing all phase relationships by 180° in Mj1,xy and, in the case of a reduction, whether all phase relationships of Mj1,xy are changed by 180°.

Alternatively and/or in addition, particularly in an additional step, a processing, particularly a changing and/or reversal of the phase relationship and/or phase information by 180°, is performed particularly if, as a result, the phase relationship and/or phase information comes closer to the expected phase relationship and/or phase information at an expected distance and/or speed between first and second object. In this case, the expected distance and/or speed between first and second object is obtained from another, e.g., earlier measurement or a measurement by means of another method, particularly using the signals according to the invention. The expected distance and/or speed between first and second object is determined particularly by means of at least one Fourier transformation of the measured values of the first and/or second signal(s) of at least one of the executions of steps a to d and/or by means of the dominant, strongest, and/or largest component(s) and/or summands and/or spectral component of at least one Fourier transformation of the measured values of the first and/or second signal(s) and/or by means of the component(s) with the greatest amplitude of a Fourier transformation of the measured values of at least one of the executions of steps a to d of the measured values of the first and/or second signal(s) of at least one of the executions of steps a to d.

Advantageously, at least two first and/or at least two second antennas are used for reception and/or transmission.

Advantageously, the first phase information is determined for each first signal and/or for each execution of steps a to d and/or by means of at least two identified phase relationships, and/or the second phase information is determined for each second signal and/or for each execution of steps a to d and/or by means of at least two identified phase relationships. In particular, the first phase information is a relative phase relationship of the first signal to a second oscillator at the second object and/or to the second signal, at the second object, and the second phase information is a relative phase relationship of the second signal to a first oscillator at the first object and/or to the first signal at the first object. In particular, the first phase information is obtained from a relative phase relationship of the first signal to a second oscillator at the second object and/or to the second signal at the second object, and the second phase information is obtained from a relative phase relationship of the second signal to a first oscillator at the first object and/or to the first signal at the first object. It is with particular advantage that the first phase information is obtained from a relative phase relationship of the first signal to a first oscillator at the first object and from a relative phase relationship of the first signal to a second oscillator at the second object, particularly through addition thereof, and/or that the second phase information is obtained from a relative phase relationship of the second signal to the second oscillator at the second object and from a relative phase relationship of the second signal to the first oscillator at the first object, particularly through addition thereof. It is with particular advantage that the first phase information is given by a relative phase relationship of the first signal to a first oscillator at the first object and a relative phase relationship of the first signal to a second oscillator at the second object, particularly through addition thereof, and/or that the second phase information is given by a relative phase relationship of the second signal to the second oscillator at the second object and a relative phase relationship of the second signal to the first oscillator at the first object, particularly through addition thereof.

Advantageously, a test object that is the first or second object and particularly one that has only a first or second antenna is rotated and/or swiveled while steps a to d are carried out multiple times, and in so doing the relative supposed speed between the first and second object is determined multiple times, particularly with the relative and/or absolute position and/or orientation of the test object during the transmission and/or reception of the first and/or second signal at the test object being detected and/or in correlation with the time of the multiple execution of steps a to d. Such correlative detection can be performed, for example, by identifying the orientation and/or position as a function of time and determining at which points in time the transmission and/or reception of the multiple executions of steps a to d takes place. The object—also reference object—from among the first and second object that does not constitute the test object rests at least in relation to its orientation in space and/or apart from maximum translational movements. Particularly, the reference object has more than one first or second antenna. In particular, it is determined in which position(s) and/or orientation(s) the supposed speed and/or the magnitude thereof is minimal and/or maximal. The orientation of the test object relative to the reference object can be derived directly from this and/or by a regression or regression analysis of the supposed speeds. For this purpose, particularly for the purpose of detecting the orientation of the test object, at least one inertial sensor and/or rotation sensor and/or acceleration sensor and/or compass is particularly used in and/or on the test object in order to continuously determine and detect the orientation of the test object in space and to determine at which orientation the first and/or second signals are received and/or transmitted at the test object. By determining the minima of the supposed speed and/or maxima of the supposed speed and/or by fitting and/or regression over the supposed speeds and/or the magnitude thereof, the orientation of the test object relative to the reference object, particularly at the times of transmission and/or reception of the first and/or second signals at the test object, can be determined. In particular, at least ten executions of steps a to d are carried out during the rotation and/or swiveling and/or for each rotation of the test object. It is with particular advantage that the orientation of the test object is rotated by at least 60°, particularly by at least 120° about at least one solid angle as a result of the rotation and/or swiveling.

Advantageously, the supposed sped and/or speed of movement of the first and second objects toward or away from one another is less than or equal to one quarter of the maximum wavelength of the first and second signals of two successive executions of steps a to d divided by the time between the ends of the two successive executions of steps a to d and/or the beginnings of the two successive executions of steps a to d, particularly less than or equal to the value obtained by dividing the result again by two.

Advantageously, the distance between the objects and/or the frequencies and/or wavelengths of the first and second signals of two successive executions and/or the time between the ends of two successive executions of steps a to d and/or between the ends of the two successive executions and/or between the beginnings of two successive executions of steps a to d and/or between the beginnings of the two successive executions of steps a to d is selected such that the supposed speed and/or speed of movement of the first and second objects toward or away from one another is less than or equal to one quarter of the largest wavelengths of the first and second signals of the two successive executions of steps a to d divided by the time between the ends of the two successive executions of steps a to d and/or between the beginnings of the two successive executions of steps a to d, particularly divided by twice the time.

With such a configuration, an especially robust, non-fault-prone, and accurate design can be achieved.

Advantageously, the frequencies of the first signals and of the second signals are equalized to one another, particularly through exchange of electromagnetic signals between the first and/or second object, particularly with adaptation to the frequency of the received electromagnetic signals, particularly under the assumption that no Doppler shift is present and/or with adaptation to the frequency of the received electromagnetic signals after correction of the frequency by a Doppler shift as a result of a previously determined supposed speed and/or of a known or determined speed and/or minimum speed.

In particular, the first and/or second signal is a Bluetooth, Wifi, DECT, mobile communications (GSM, UMTS, LTE and/or 5G) signal.

The object is also achieved by a system for the high-resolution determination of a distance between a first object and a second object by means of electromagnetic signals transmitted between the first and the second object, comprising the first and the second object, the first object having at least one first antenna and/or the second object having at least one antenna, at least one oscillator, at least one analog-to-digital converter, mixer, switch for switching between a plurality of antennas, a CPU, a memory, evaluation unit, input amplifier, output amplifier, band filter, at least one timer, and/or a software, particularly in a memory, the software in the first object and in the second object being embodied particularly such that it carries out the method according to the invention upon execution by a respective CPU at the first and at the second object. The system represents and/or the objects each represent a hardware and software system. In particular, a first of the two objects is portable and particularly a mobile telephone, and/or the other of the two objects is stationary at least for the period of the measurement, particularly stationary.

In particular, the system is a Bluetooth, Wifi, DECT, mobile communications (GSM, UMTS, LTE and/or 5G) system.

The object is also achieved by a method for securing an access system having a first object, particularly an authorization means, and a second object, particularly an access control means, with first signals being transmitted between the first object, particularly having a first antenna, and the second object, particularly having a second antenna, at a first frequency from a first among the two objects, particularly from the first or second object, to a second among the two objects, particularly from the first or second object, and with second signals being transmitted between the second object and the first object at a second frequency from the second among the two objects, particularly from the first or second object, to the first among the two objects, particularly from the first or second object, by means of a transmission system that particularly has a, particularly the, first antenna and/or a, particularly the, second antenna, with the distance and/or speed between first and second object being determined by means of a method or system according to the invention and, upon overshooting of a predetermined distance and/or speed and/or in the event of a predetermined deviation of the distance and/or speed determined by means of a method or system according to the invention from a distance and/or speed that was predetermined or calculated using other methods, access, egress, activation, deactivation, and/or opening by the second object, particularly access control means, is denied.

The object is also achieved by an access control system having a first object, particularly an authorization means, particularly having a first antenna, and a second object, particularly an access control means, particularly having a second antenna, the access control system comprising a transmission system having a, particularly the, first and a, particularly the, second antenna set up between the first object, particularly authorization means, and the second object, particularly access control means, in order to transmit first signals at a first frequency from the first antenna to the second antenna and second signals at a second frequency from the second antenna to the first antenna, the access control system being set up to determine a distance and/or speed between the first and second object by means of one of the above methods and, upon overshooting of a predetermined distance and/or speed and/or in the event of a predetermined deviation of the distance and/or speed determined by means of the method from a predetermined distance or speed that was predetermined or calculated using other methods, denying access, egress, activation, deactivation, and/or opening, particularly by the second object, particularly access control means, particularly to the second and/or first object.

The object is also achieved through the use of a supposed distance and/or speed and/or distance and/or speed for access control, authentication, distance measurement, synchronization, and/or detection and/or defense against relay attacks, with first signals being transmitted at a first frequency by means of a transmission system, particularly having a first and/or second antenna, from a first to a second object, and with second signals being transmitted at a second frequency from the second to the first object, a supposed speed and/or supposed distance determined on the basis of a—particularly inventive—object of measurement being used in order to detect and/or determine the distance and/or speed according to a method and/or system according to the invention.

The above remarks concerning the method for determining the distance and/or speed apply to identical concepts as well as to the method for securing an access system, the use, and/or the system.

In particular, with regard to the methods, the use, and/or the system, access, egress, activation, deactivation, and/or opening, particularly by the access control means and/or of the access control means, is granted if there is no deviation and/or overshoot or if there is no deviation and/or overshoot. In particular, the access, egress, activation, deactivation, and/or opening is granted only if there are no or only a predetermined number of deviation and/or overshoots in a multitude of repetitions, or if no or no more than a predetermined number of deviations and/or overshoot(s) are/were present.

In particular, the access, egress, activation, deactivation, and/or opening is granted only if at least one further authentication requirement is met—e.g., a correct password is entered or the certificate is valid and/or designated as permissible in the access system. It is especially advantageous if the at least one authentication requirement includes a plurality of authentication requirements that are dependent on the time of reception, particularly according to this application, and/or at least one authentication requirement that is independent of the reception time. The temporal validity of a certificate—which, although it may be dependent on time, it is not directly dependent on the time of reception itself—is also independent of the time of reception.

In particular, access is understood not only as access to an area in the sense of the possible movement of an object and/or a person into this area, e.g., the interior of a room or of a vehicle, but also, in particular, access to a function, particularly including in the sense of the activation of a function, such as access to the function of cranking or starting a vehicle or access to the "coffee" function of a coffee machine. Accordingly, access control systems are particularly not only those which control, restrict, and/or protect only access to an area in the sense of the possible movement of an object and/or a person into this area, but particularly also those which control, restrict, and/or protect access to a function, particularly including in the sense of the activation of a function.

Authorization systems, e.g., for registration in a computer system, for example by means of a password and/or certificate, or also classic access control systems such as locks, barriers, doors, and/or gates, and/or for the activation of functions, for example a service station such as a coffee machine, can also be employed particularly as an access control system. In particular, these can be doors and/or ignition locks and/or starters of a vehicle (e.g., motor vehicle, aircraft, ship, or autonomous taxi—as well as any and all other conceivable vehicles). They can also involve access to and/or activation of any service station (ATM, telephone, coffee machine—the list is never-ending). Mobile telephone, keys, certificates, and/or input systems for entering passwords can also be used as authorization means.

In particular, the transmission system of the methods, the use, and/or the system is wireless, e.g., one used for communication with keyless remotes or near-field keys, particularly for motor vehicles, and between near-field keys and a motor vehicle or two Bluetooth modules.

According to the invention, the system comprises at least one control device at the first object and one control device at the second object and at least one evaluation unit, particularly at the first object and/or test object, comprising a CPU and a memory, particularly at the first and/or second object, the first control device being set up to multiply execute the actions of a. transmitting a first signal at a first frequency from the first object with at least one first antenna
and
receiving a second signal at the first object with at least one first antenna
the second control means being set up to multiply execute the actions of
transmitting the second signal at a second frequency from the second object with at least one second antenna and
receiving the first signal at the second object with at least one second antenna.

The control devices can be part of the at least one evaluation unit, share a CPU and/or a memory with it, or be implemented integrally with it, e.g., in common hardware.

According to the invention, the at least one evaluation unit is set up to provide at least one first piece of phase information that is determined from and/or by means of at least one identified phase relationship of the received first signal for each first signal and/or for each execution of steps a to d, as well as to provide at least one second piece of phase information that is determined from and/or by means of at least one identified phase relationship of the received second signal for each second signal and/or for each execution of steps a to d.

According to the invention, the at least one evaluation unit is set up to form an object of measurement, particularly measurement matrix, from both the first and second phase information and at least one amplitude for each first and/or second piece of phase information or for each execution of steps a to d. According to the invention, the at least one evaluation unit is set up to determine a supposed distance and/or supposed, particularly relative, speed between the first and second object from the object of measurement, the supposed speed being a speed at which the objects move toward one another or away from one another, with the determination of a supposed distance and/or supposed relative speed between first and second object from the object of measurement being achieved through comparison of the object of measurement with a set and/or selection of stored and/or calculated reference objects of measurement relating to different distances and different relative speeds, with each reference object of measurement being associated with a distance and a speed, with the supposed distance being assumed to be the distance that is associated with the stored and/or calculated reference object of measurement that best fits, is closest to, and/or is most similar to the object of measurement, and/or the supposed relative speed being assumed to be the speed that is associated with the stored and/or calculated reference object of measurement that best fits, is closest to, and/or is most similar to the object of measurement.

With respect to the organization, determination, and/or provision of individual aspects and/or configurations, particularly with regard to object of measurement, reference objects of measurement, set, and/or selection of stored and/or calculated reference objects of measurement, phase information, and/or first and/or second signal and/or the generation thereof, and/or with respect to the determination of a supposed distance and/or supposed relative speed, similarity, and/or distance, the foregoing remarks apply accordingly.

DETAILED DESCRIPTION

Additional advantageous embodiments are to be described purely for the sake of example with reference to the schematic FIGURE that follows.

FIG. 1 shows an illustration of the phase relationships and times during an execution of steps a to d with two stationary objects O1 and O2. Shown on a common time axis are the phase relationship Ph1O1 of the oscillation of a first oscillator OZ1 at the first object O1 and the phase relationship Ph1O2 of the signal of the first oscillator OZ1 received by a second antenna A2 at the second object O2 and the phase relationship Ph2O2 of the oscillations of a second oscillator OZ2 at the second object O2 and the phase relationship Ph2O1 of the signal of the second oscillator OZ2 received by a first antenna A1 at the first object O1.

The transmission is denoted by an oblique arrow; the time of flight ToF of the signals is always denoted by a vertical arrow.

t0, t1, t2, t2' represent timepoints. At timepoint t0, the oscillators have a phase offset of dPht0. Due to different frequencies F1, F2 of the oscillators, the phase difference changes over the course of time.

Assuming that $(t2-t1) \gg (t1'-t1)$ and $(t2-t1) \gg (t2'-t2)$, for example $(t2-t1) > 5 \times (t1'-t1)$ and $(t2-t1) > 5 \times (t2'-t2)$, and then one obtains approximately:

$$Ph1O2(t1') = 2\pi*F*D/c + dPht0 + (t1-t0)*(F2-F1)$$

and $$Ph2O1(t2') = 2\pi*F*D/c - dPht0 + (t2-t0)*(F1-F2)$$

where D represents the distance between O1 and O2, c the speed of light, and Ph1O2 (t1') the phase of the phase relationship of the first signal at the second object at time t1', and Ph2O1 (t2') the phase relationship of the phase of the second signal at the first object at time t2', and F represents the mean of F1 and F2 (F=min(F1, F2)).

The addition yields $$Ph1O2(t1') + Ph2O1(t2') = 2\pi*F*D/c + dPht0 + (t1-t0)*(F2-F1) + 2\pi*F*D/c - dPht0 + (t2-t0)*(F1-F2)$$

$$Ph1O2(t1') + Ph2O1(t2') = 2\pi*F*D/c + (t1-t0*(F2-F1) + 2\pi*F*D/c + (t2-t0)*(F1-F2)$$

$$Ph1O2(t1')+Ph2O1(t2')=(2\pi*F)*2*D/c+(t1-t0)*(F2-F1)-(t2-t0)*(F2-F1)$$

$$Ph1O2(t1')+Ph2O1(t2')=(2\pi*F)*2*D/c+(t1-t0-t2+t0)*(F2-F1)$$

$$Ph1O2(t1')+Ph2O1(t2')=(2\pi*F)*2*D/c+(t1-t2)*(F2-F1)$$

$$2*D=(Ph1O2)(t1')+Ph2O1(t2'))-(t1-t2)*(F2-F1))*c/(2\pi*F)$$

With cPhSum as theoretical phase relationship as addition of first and second theoretical phase relationship as:

$$cPhSum=((Ph1O2(t1')+Ph2O1(t2'))-(t1-t2)*(F2-F1))$$

one obtains:

$$2*D=cPhSum*c/(2\pi*F)$$

By using a plurality of antenna combinations of first and second antennas and multiple execution of steps a to d, a measurement matrix with complex indicators can be created. By forming the autocorrelation matrix, an object of measurement can be created. The distance and the speed between the objects can be determined using reference objects.

Under the further assumption that the frequency difference between two executions of steps a to d is substantially, particularly at least 5 times, greater than the frequency difference between the first signal and the second signal of the first or every execution of steps a to d and is substantially, particularly at least 5 times, greater than the frequency difference between the first signal and the second signal of the second execution of steps a to d at the frequencies FA1 and FA2 of the first execution and the frequencies FB1 and FB2 of the second executions instead of F1 and F2 above and where FA=mean value (FA1, FA2) and FB=mean value (FB1, FB2), and where $$2*D=cPhSum.A*c/(2\pi*FA)$$

$$2*D=cPhSum.B*c/(2\pi*FB)$$

an approximation of the following can be found:

$$2*D=(cPhSum.A-cPhSum.B)*c/(2\pi*(FA-FB))$$

where cPhSum.A is cPhSum of the first execution and cPhSum.B is cPhSum of the second execution.

Insofar as the distance or the frequency interval between the executions of steps a to d are maintained sufficiently small, the $2\pi$ ambiguity can be avoided.

The invention claimed is:

1. A method for the high-resolution determination of a distance and/or a speed between a first object (O1) and a second object (O2) by means of electromagnetic signals that are transmitted between the first object and the second object, comprising multiple execution of the following steps a. to d. at different first frequencies and different second frequencies:
   a. transmitting a first signal at a first frequency from the first object with at least one first antenna;
   b. receiving the first signal at the second object with at least one second antenna;
   c. transmitting a second signal at a second frequency from the second object with the at least one second antenna; and
   d. receiving the second signal at the first object with the at least one first antenna; and
   providing at least one first piece of phase information for each first signal or for each execution of steps a. to d. determined from at least one identified phase relationship of the received first signal; and
   providing at least one second piece of phase information for each second signal or for each execution of steps a. to d. determined from at least one identified phase relationship of the received second signal; and
   forming at least one object of measurement from the first phase information and second phase information and from at least one amplitude; and
   determining a supposed distance and/or supposed relative speed between the first object and second object from the at least one object of measurement, the supposed relative speed being a speed at which the first object and the second object move toward one another or away from one another, with the determination of the supposed distance and/or supposed relative speed between the first object and second object from the at least one object of measurement being achieved through comparison of the at least one object of measurement with a set or selection of stored or calculated reference objects of measurement relating to different distances and different relative speeds, with each of the reference objects of measurement being associated with a distance and a speed, with the supposed distance being a distance that is associated with the stored or calculated reference object of measurement that best fits, is closest to, or is most similar to the at least one object of measurement, and/or the supposed relative speed being a speed that is associated with the stored or calculated reference object of measurement that best fits, is closest to, or is most similar to the at least one object of measurement.

2. The method as set forth in claim 1, wherein each first piece of phase information is obtained by determining the frequencies of the respective first signal and of the respective second signal at the second object and/or the frequency difference between the respective first signal and the respective second signal at the second object and calculating a first theoretical phase relationship between the respective first signal and respective second signal at the second object at a notional timepoint for each of the respective first signal and respective second signal, and/or wherein each second piece of phase information is obtained by determining the frequencies of the respective second signal and of the respective first signal at the first object and/or the frequency difference between the respective second signal and the respective first signal at the first object and calculating a first theoretical phase relationship between the respective first signal and respective second signal at the second object at a notional timepoint for each of the respective first signal and respective second signal.

3. The method as set forth in claim 1, wherein the phase information contains phase relationships and/or the processing of the at least one object of measurement includes adding and/or subtracting of the first phase information and second phase information for each execution of steps a. to d., and halving the added phase information.

4. The method as set forth in claim 1, wherein the objects of measurement contain the phase information and the amplitude of the received first signals and/or second signals.

5. The method as set forth in claim 1, wherein the first signals for each different execution of steps a. to d. are either equal or unequal and/or the second signals for each different execution of steps a. to d. are either equal or unequal.

6. The method as set forth in claim 1, wherein the method includes transmitting a value equal to or corresponding to a difference between the first frequency and the second frequency and/or exploiting the respective frequency differences between the first frequency and the second frequency at the first object or at the second object for the purpose of processing the at least one object of measurement and/or determining the supposed distance and/or supposed relative speed.

7. The method as set forth in claim 1, wherein the objects of measurement are formed from at least one vector with complex numbers, by forming a matrix, by using the vectors as columns or rows of the matrix.

8. The method as set forth in claim 7, wherein the matrix that is formed is an autocorrelation matrix.

9. The method as set forth in claim 1, wherein the at least one object of measurement is processed before the comparison with the reference objects of measurement in order to eliminate and/or reduce the effects of phase jumps and/or multipath environments and/or environmental influences and/or measurement errors.

10. The method as set forth in claim 1, wherein the processing of the at least one object of measurement is and/or includes reducing the dimension.

11. The method as set forth in claim 1, wherein the processing of the at least one object of measurement includes processing the contained phase information or contained phase relationships.

12. The method as set forth in claim 11, wherein the processing of the contained phase information or contained phase relationships comprises halving the phase information or phase relationships.

13. The method as set forth in claim 11, wherein a shifting of at least some of the phase information or phase relationships comprises shifting by 180° all phase information or phase relationships of one of the executions of steps a. to d.

14. The method as set forth in claim 1, wherein at least two first antennas and/or at least two second antennas are used for receiving and wherein the first phase information for each first signal comprises or is determined from at least two identified phase relationships of the received first signal and/or the second phase information for each second signal comprises and/or is determined from at least two identified phase relationships of the received second signal.

15. The method as set forth in claim 1, wherein a test object of the first object and second object is moved, rotated, and/or swiveled while steps a. to d. are executed multiple times and the supposed relative speed between the first object and second object is determined multiple times, and wherein the relative and/or absolute position and/or orientation of the test object is detected.

16. The method as set forth in claim 1, wherein the supposed relative speed is less than or equal to one quarter of a largest wavelength of the first signal and second signal divided by the time between the ends or the beginnings of two executions of steps a. to d.

17. The method as set forth in claim 1, wherein the frequencies of the first signal and of the second signal of an execution of steps a. to d. are equalized to one another, with the first frequency and second frequency of the respective execution being equalized to one another.

18. The method as set forth in claim 1, wherein the forming of the object of measurement comprises forming a measurement matrix.

19. A system for the high-resolution determination of a distance and/or speed between a first object (O1) and a second object (O2) by means of electromagnetic signals that are transmitted between the first object and second object, comprising the first object and second object, the first object having at least one first antenna and the second object having at least one second antenna, wherein the system further comprises a first control device at the first object and a second control device at the second object and at least one evaluation unit containing a CPU and a memory, the first control device being set up to multiply execute the actions of:
  a. transmitting a first signal at a first frequency from the first object with the at least one first antenna; and
  b. receiving a second signal at the first object with the at least one first antenna, the second control device being set up to multiply execute the actions of:
  c. transmitting the second signal at a second frequency from the second object with the at least one second antenna; and
  d. receiving the first signal at the second object with the at least one second antenna; and
  with the at least one evaluation unit being set up for the purpose of:
    providing at least one first piece of phase information for each first signal or for each execution of steps a to d determined from at least one identified phase relationship of the received first signal; and
    providing at least one second piece of phase information for each second signal or for each execution of steps a to d determined from at least one identified phase relationship of the received second signal; and
  forming an object of measurement from the at least one first piece of phase information and at least one second piece of phase information and from at least one amplitude for each of the at least one first piece of phase information and/or the at least one second piece of phase information or for each execution of steps a to d and determining a supposed distance and/or supposed relative speed between the first object and second object, the supposed relative speed being a speed at which the first object and second object move toward one another or away from one another, with the determination of the supposed distance and/or supposed relative speed between the first object and second object from the object of measurement being achieved through comparison of the object of measurement with a set or selection of stored or calculated reference objects of measurement relating to different distances and different relative speeds, with each reference object of measurement being associated with a distance and a speed, with the supposed distance being a distance that is associated with the stored or calculated reference object of measurement that best fits, is closest to, or is most similar to the object of measurement, and/or the supposed relative speed being a speed that is associated with the stored or calculated reference object of measurement that best fits, is closest to, or is most similar to the object of measurement.

* * * * *